Dec. 9, 1924.

W. B. MURRAY 1,518,214

RECORDING MECHANISM

Original Filed Aug. 12, 1918    8 Sheets-Sheet 1

Inventor
WILLIAM B. MURRAY

By

Attorney

Dec. 9, 1924.

W. B. MURRAY 1,518,214

RECORDING MECHANISM

Original Filed Aug. 12. 1918     8 Sheets-Sheet 2

Inventor
WILLIAM B. MURRAY

By

Attorney

Dec. 9, 1924.　　　　　　　　　　　　　　　　　1,518,214
W. B. MURRAY
RECORDING MECHANISM
Original Filed Aug. 12, 1918　　　8 Sheets-Sheet 3

Inventor
WILLIAM B. MURRAY

By
C. H. Darken  Attorney

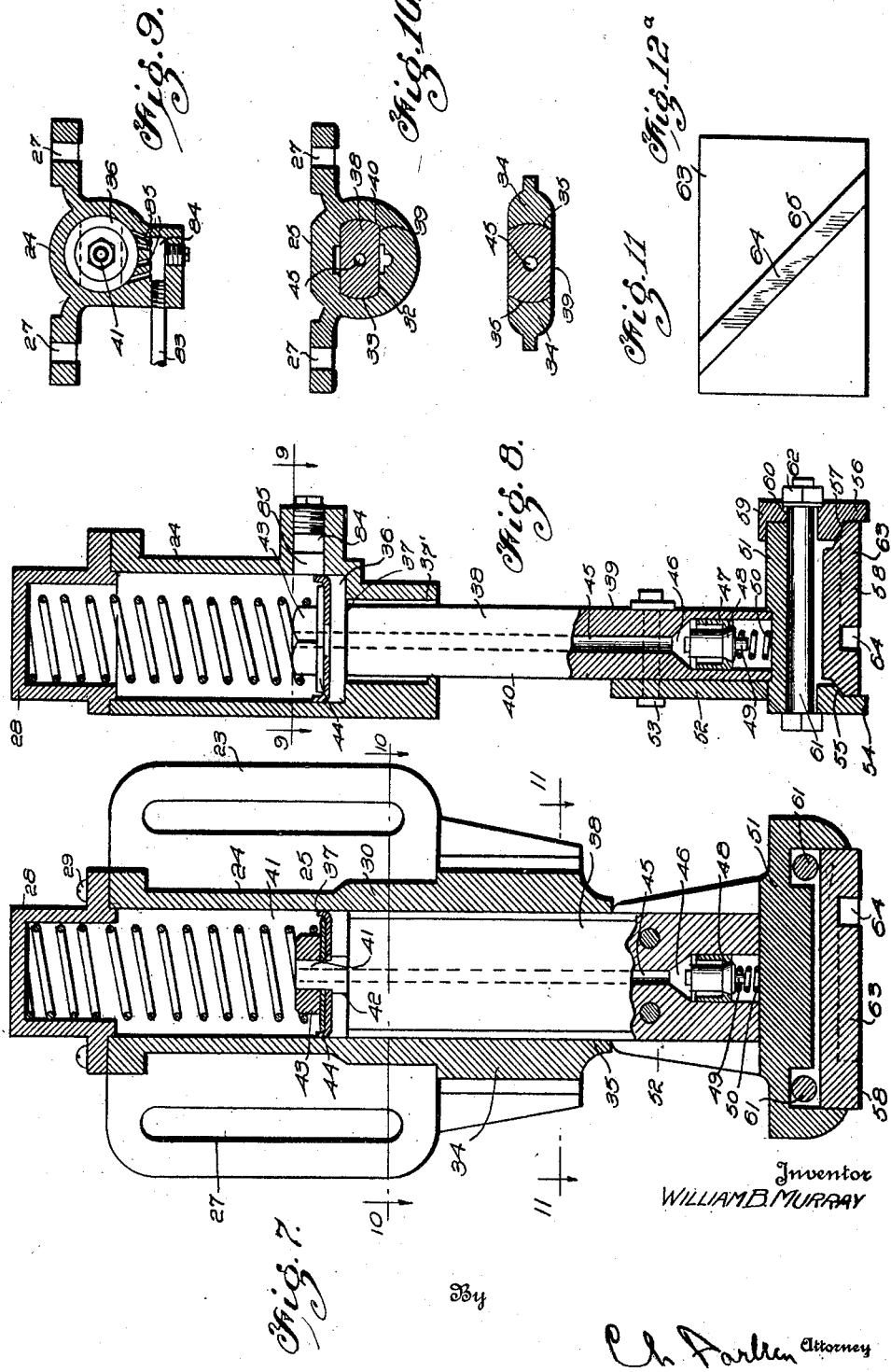

Dec. 9, 1924.
W. B. MURRAY
1,518,214
RECORDING MECHANISM
Original Filed Aug. 12. 1918    8 Sheets-Sheet 5
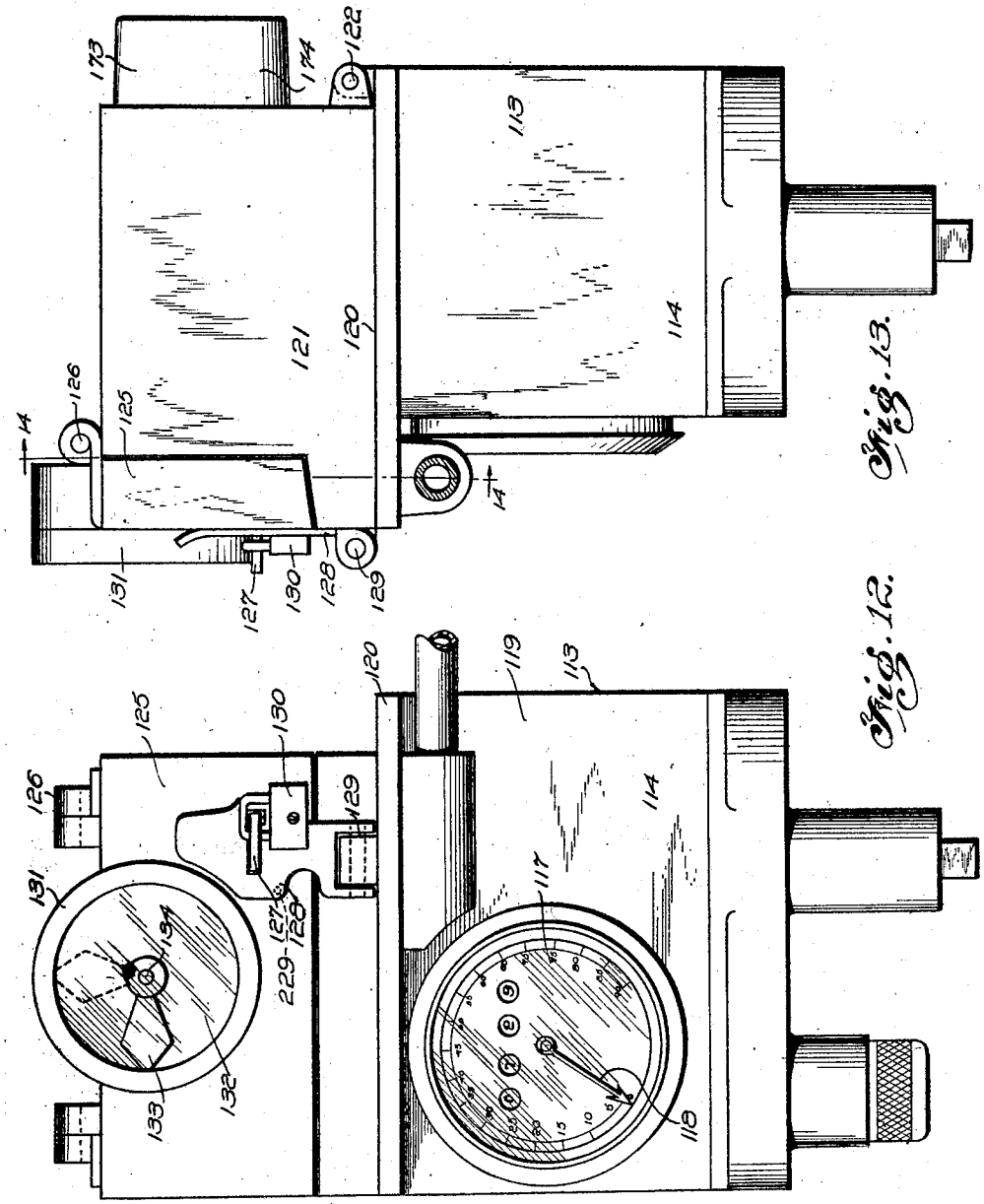
Inventor
WILLIAM B. MURRAY

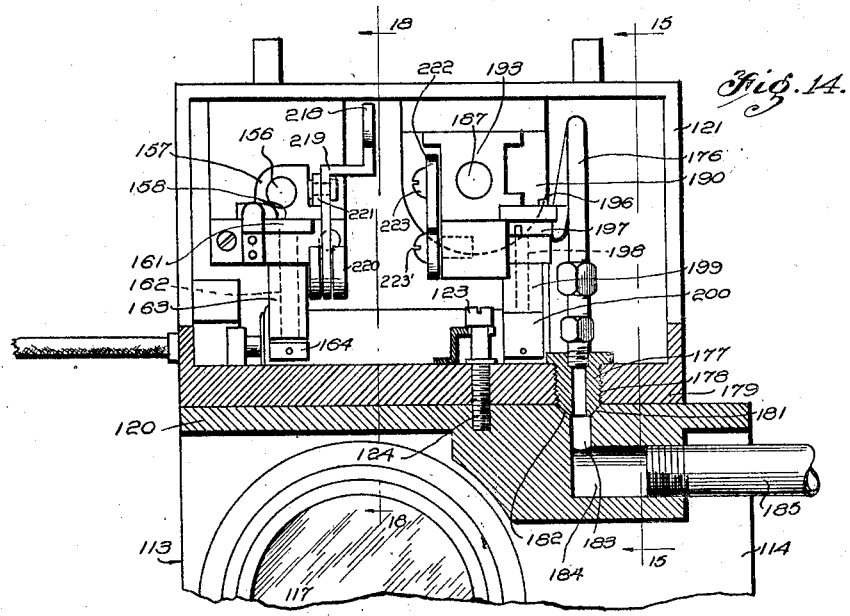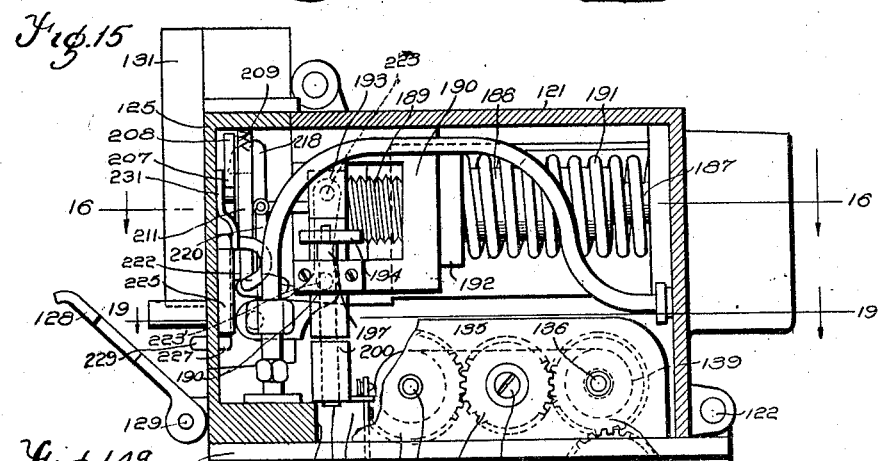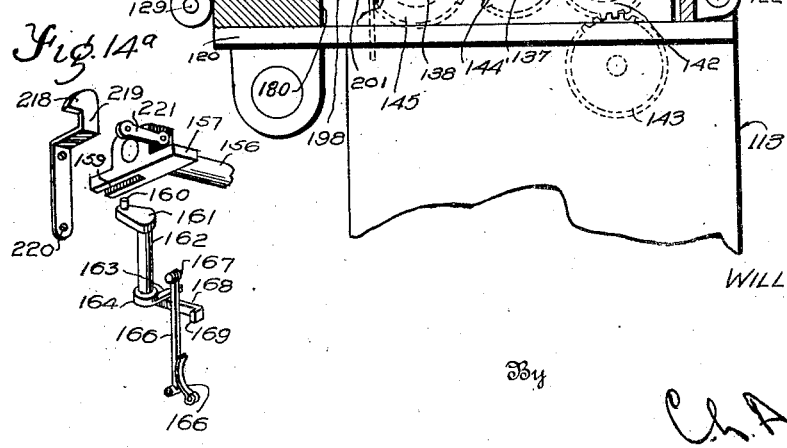

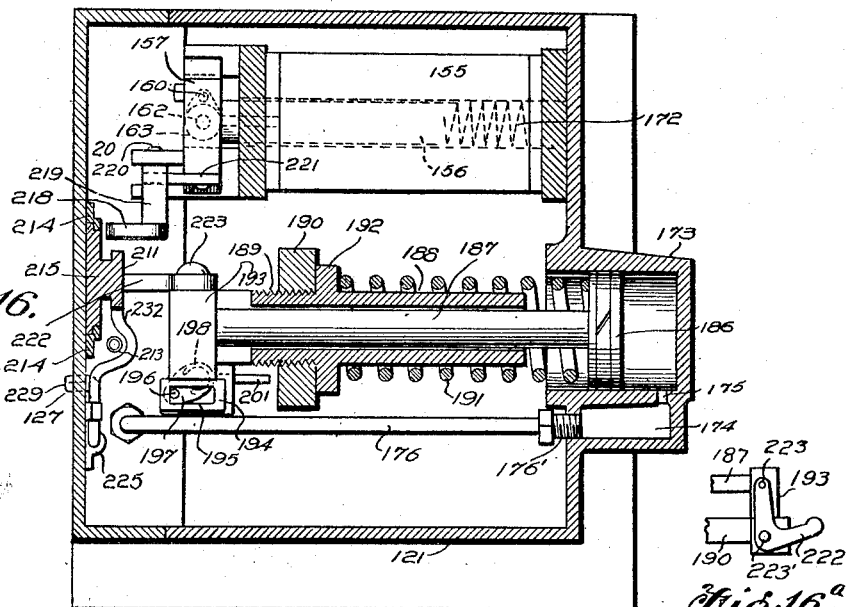
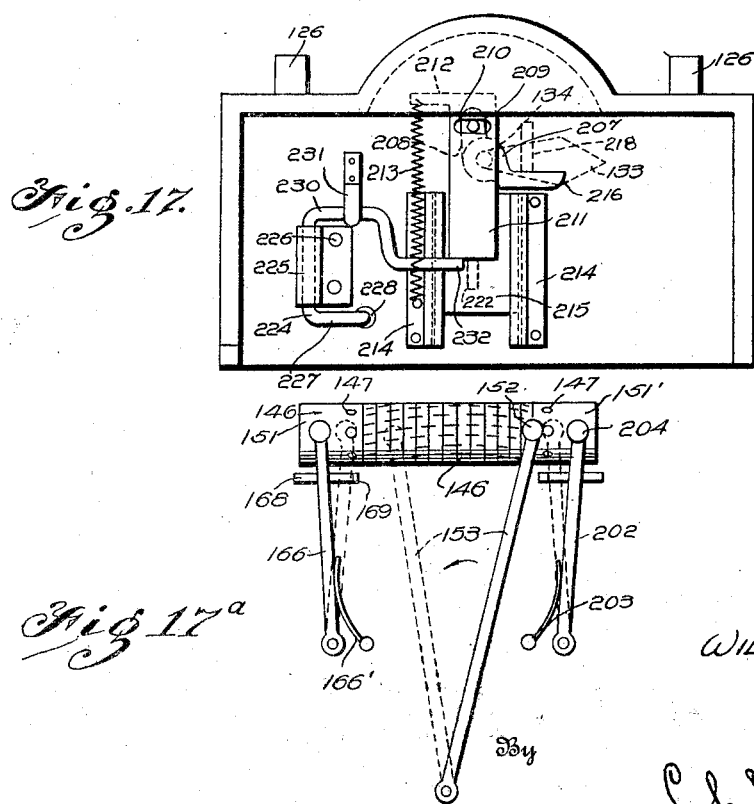

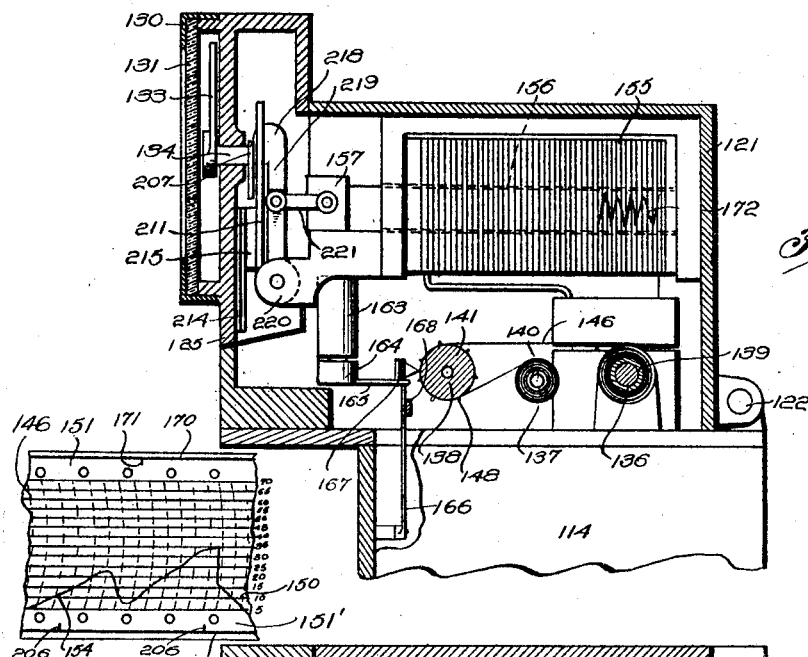

Patented Dec. 9, 1924.

1,518,214

UNITED STATES PATENT OFFICE.

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

RECORDING MECHANISM.

Original application filed August 12, 1918, Serial No. 249,473. Divided and this application filed March 28, 1921. Serial No. 456,466.

*To all whom it may concern:*

Be it known that I, WILLIAM B. MURRAY, a citizen of the United States, residing at Danville, in the county of Vermilion and State of Illinois, have invented certain new and useful Improvements in Recording Mechanism, of which the following is a specification.

My invention relates to railway control systems, wherein ramps are arranged near the entrance ends of the blocks, to control the same, and a mechanically operated and electrically controlled apparatus is carried by the engine or vehicle traveling upon the track, such apparatus controlling the operation of the engine upon contact with the ramp, depending upon whether or not the ramp is energized or de-energized, and has particular reference to means for indicating or recording, or both, whether or not the ramp is energized, and the action of the apparatus.

In a copending application, Serial No. 249,473, filed August 12, 1918, I have claimed the mechanically operated and electrically controlled apparatus whereby the throttle valve of the engine is actuated by the ramp. In this application, which is a division of said application Serial No. 249,473, I claim the recording mechanism per se.

In the present invention, I have provided a recording device comprising a traveling chart, said chart being provided with longitudinal division to indicate speed, and transverse divisions to indicate time units, a marker arranged at each side of the chart, and normally marking a line longitudinally thereof, and controlling means for said marker connected to the vehicle stopping mechanism, whereby one of said markers will make a transverse line when the train passes an energized ramp, and the train stopping means is held in inoperative position, and the other marker make a transverse line when the train passes a de-energized ramp and the vehicle stopping means is actuated.

Figure 1:
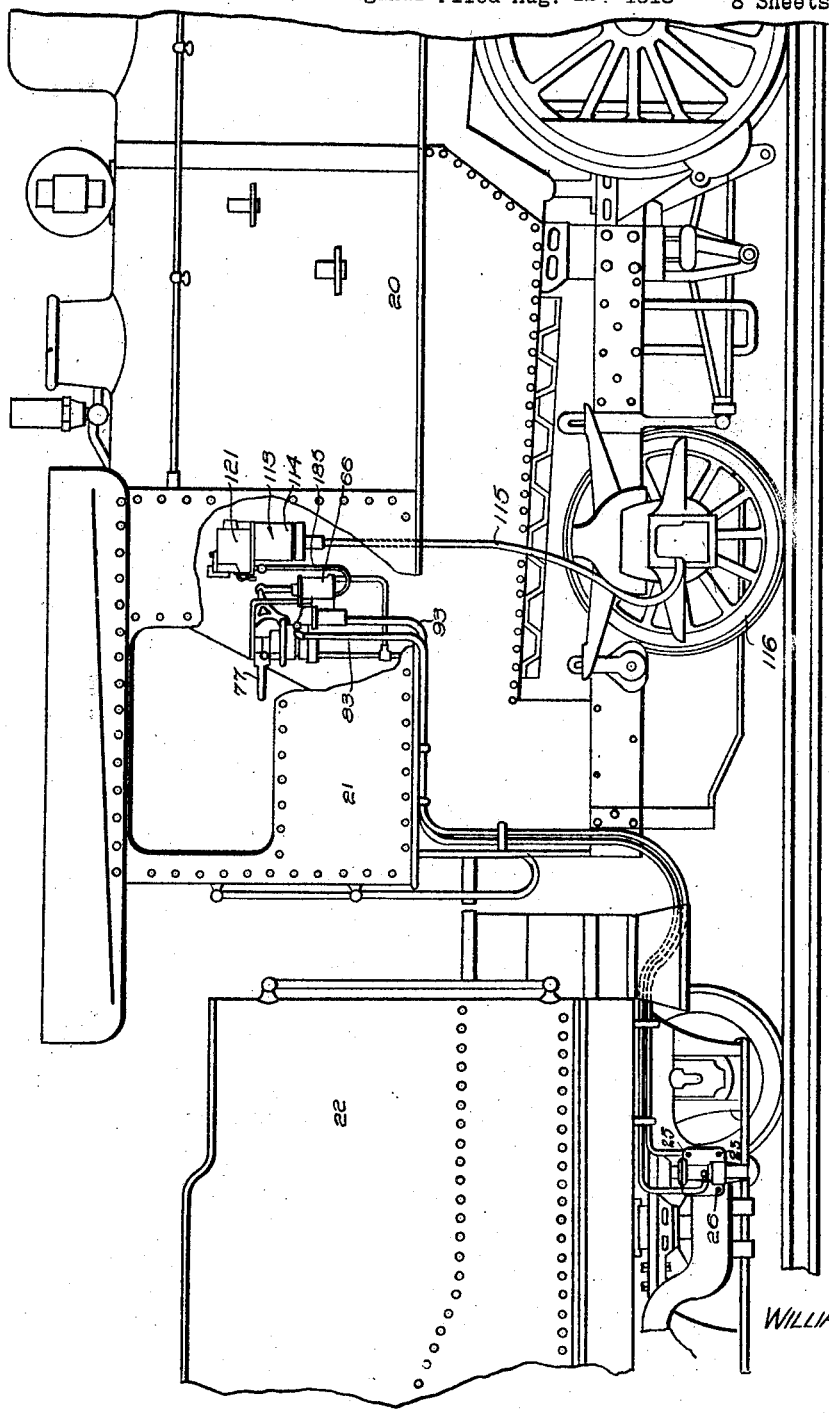

In the accompanying drawings forming a part of this specification, and in which like numerals are employed to designate like parts throughout the same, Figure 1 is a side elevation of a railway locomotive, having my apparatus applied thereto.

Figures 2, 3:
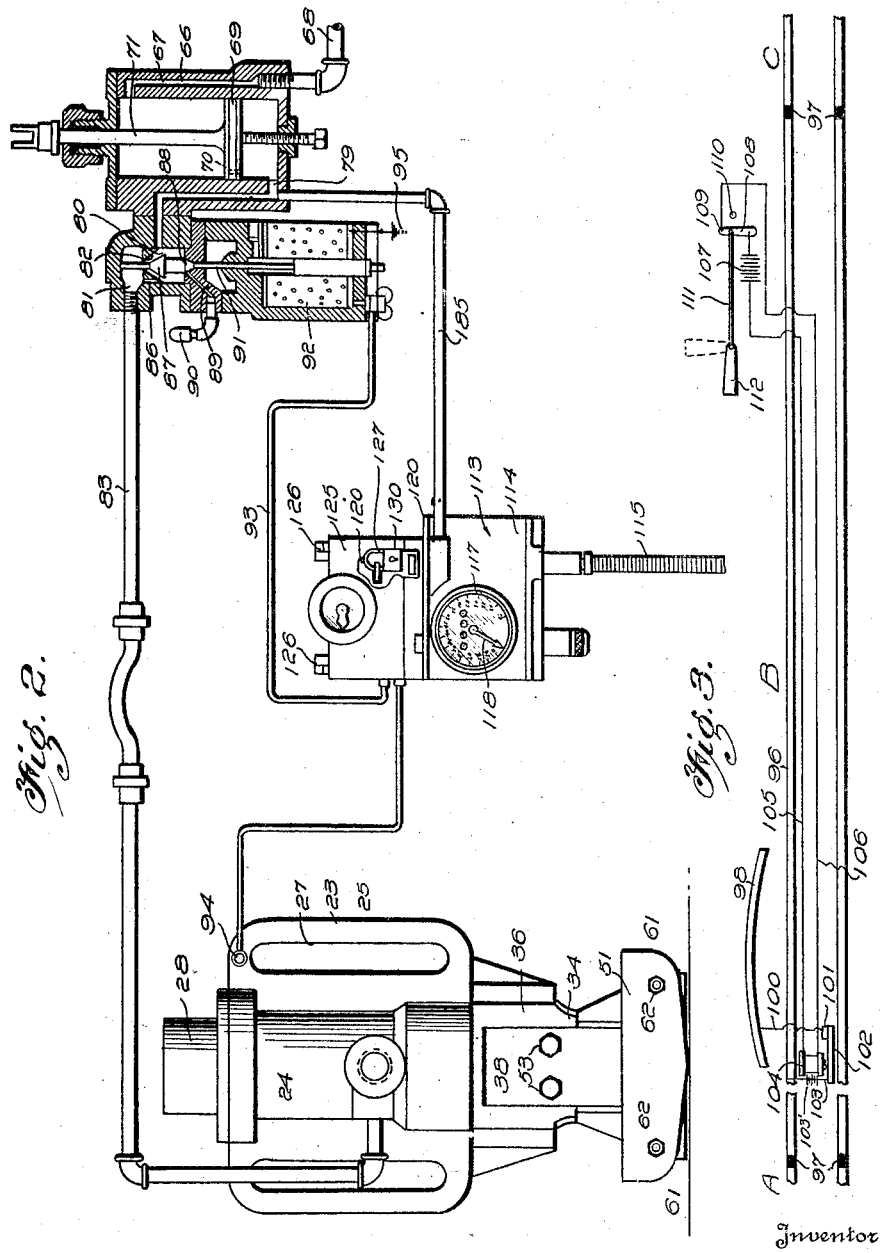
Figure 4:
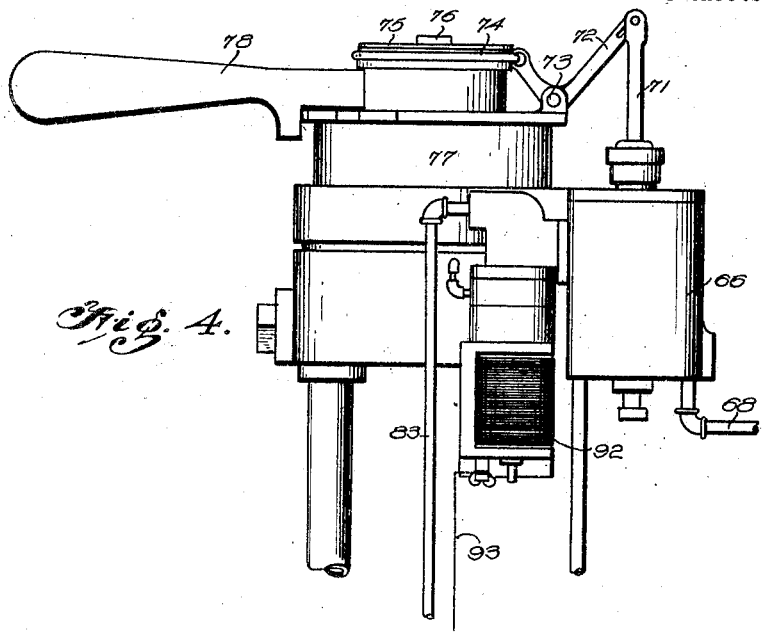
Figure 5:
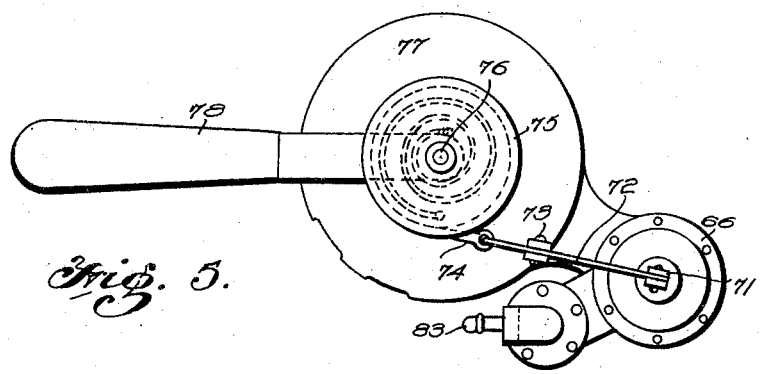
Figure 6:
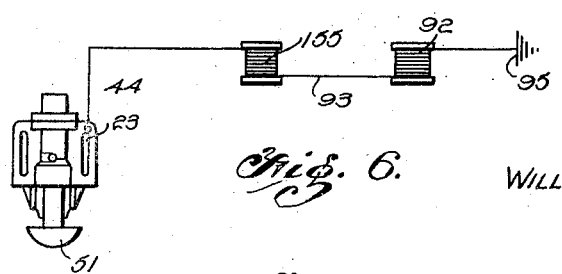

Figure 2 is a side elevation of the apparatus removed, parts being shown in section for the purpose of illustration, Figure 3 is a diagrammatic view of a track block and its circuits, Figure 4 is a side elevation of an engineer's air brake valve and operating means therefor, Figure 5 is a plan view of the same, Figure 6 is a diagrammatic view of the shoe and associated circuit, Figure 7 is a central vertical sectional view through the shoe and associated elements, Figure 8 is a similar view, taken at a right angle to the showing of Figure 7, Figure 9 is a horizontal sectional view taken on line 9—9 of Figure 8, Figure 10 is a similar view taken on line 10—10 of Figure 7, Figure 11 is a similar view taken on line 11—11 of Figure 7, Figure 12ª is a bottom plan view of the contact shoe, Figure 12 is a side elevation of the combined indicating and recording mechanism, Figure 13 is an edge elevation of the same, Figure 14 is a transverse sectional view taken on line 14—14 of Figure 13, Fig. 14ª is a perspective view of the solenoid armature cross head and associated elements, Figure 15 is a longtudinal sectional view taken on line 15—15 of Figure 14, Figure 16 is a horizontal sectional view taken on line 16—16 of Figure 15, Figure 16ª is a detail view of part of the recording mechanism, Figure 17 is a side elevation of the inner side of the swinging door of the indicator, showing mechanism associated therewith in elevation, together with speed indicating means, shown partly diagrammatically, Figure 17ª is a detail view of the marking implements forming a part of the recorder, Figure 18 is a vertical sectional view taken on line 18—18 of Figure 14, Figure 18ª is a plan view of a section of the chart, with the records made thereon, Figure 19 is a horizontal sectional view taken on line 19—19 of Figure 15, and Figure 19ª is a detailed perspective view of one of the marking devices and operating members therefor.

In the drawings, wherein for the purpose of illustration is shown a preferred embodiment of my invention, attention being called first to Figures 1 to 11 inclusive, the numeral 20 designates a railway locomotive, of any well known or perferred type. This locomotive is equipped with a cab 21, and tender 22, as is well known.

As more clearly shown in Figures 1, 2, 7, 8, 9, 10, and 11, the numeral 23 designates a vertically arranged guide, as a whole, comprising a cylinder 24 which is preferably cast integral with a plate or foundation 25. This plate is bolted or clamped to the framework of the tender 22, and is insulated therefrom, as clearly illustrated in Figure 1. The bolts 26 extend through longitudinal slots 27, formed in the plate 25. The upper end of the cylinder 24 is closed by means of a cap or head 28, having an air tight connection therewith, and secured thereto by means of bolts 29 or the like, as shown. The cylinder 24 is provided with a depending extension 30, having an opening or bore 31, having flat sides 32 and curved ends 33, as more clearly shown in Figure 10. Depending from the cylinder extension 30 are oppositely arranged guide-ways 34, having transversely curved faces 35, as more clearly shown in Figure 11.

Mounted to reciprocate within the cylinder 24 is a piston or piston valve 36, having packing 37, for forming an air-tight fit.

The piston is arranged upon the upper end of a vertically movable bar 38, which has flat sides 39, and transversely curved edges 40, as more clearly shown in Figure 10. This bar is adapted to move within the cylinder extension 30 and between guides 34. The bar 38 is provided at its upper end with a reduced extension 41, adapted to pass through an opening 42 in the piston 36. This reduced extension is externally screw-threaded for the reception of a nut 43, which engages a washer 44 in turn holding the packing in place upon the piston, and the piston upon the upper end of the bar 38.

The bar 38 is provided with a longitudinally extending port 45, passing through the upper end of the extension 41 thereof, and discharging at its lower end into the upper end of a recess or chamber 46, formed in the bar 38. Arranged within the recess 46 is a valve seat 47, adapted to engage with an upwardly seating valve 48, having a stem 49. This stem is surrounded by a compressible coil spring 50, serving to hold the valve seated.

The spring 50 contacts with the upper side or face of a shoe 51, provided at or near one longitudinal edge with a vertical extension plate 52, preferably cast integral therewith. This extension plate is bolted or otherwise rigidly clamped to the lower end of the bar 38 by bolts 53 or the like. It might be stated at this point, that should the shoe 51 work loose so that it could descend perceptibly with respect to the bar 38 or become separated from the bar 38, the pressure within the port 45 would unseat the valve 48, as the tension of the spring 50 would be lessened, thus allowing the pressure to escape to the atmosphere.

As more clearly shown in Figure 8, the shoe 51 is provided with a longitudinal flange 54, having a tapered inner face 55. Arranged opposite the flange 54 is a detachable plate 56, having an inclined inner face 57. This plate is adapted to engage the opposite edge of the shoe 51, and is provided with an over-hanging flange 59. The flange 54 and plate 56, have openings 60, receiving bolts 61, having nuts 62. The flange 54 and the plate 56 serve to receive therebetween a hard iron insert 63, which is clamped to the same. From the foregoing description, it is obvious that if the insert 63 should drop out or become displaced without injury to the shoe 51, the valve 48 would not be opened. The insert 63 is provided upon its lower contacting face, as clearly shown in Figure 12ª, with a diagonally arranged groove 64, preferably rectangular in cross-section, providing a sharp cutting edge 65, which serves to effectively clean the ramp, to be described, also enabling foreign material which may accumulate upon the shoe, to be discharged off of the same through the groove.

The numeral 66 (Figures 1 and 2) designates a cylinder, having a port 67 discharging into the upper end thereof. Pressure is supplied into the port 67 through a pipe 68. Mounted to reciprocate within the cylinder is a piston 69, having a contracted port 70. The piston 69 is connected with a rod 71, which is connected with a bell-crank lever 72, (Figure 4) pivoted at 73. This bell-crank lever has connection with a flexible element or cable 74, wound upon a drum 75, connected with the stem 76 of the valve of an engineer's air brake valve 77, having the usual lever 78 to turn the valve for opening the same. When the piston 69 descends, the air brake valve will be actuated, to stop the train or engine. Leading into the lower end of the cylinder 66 is an outlet port 79, discharging into a chamber 80. The chamber 80 is adapted to exhaust into the chamber 81, through a valve seat opening 82. The chamber 81 leads into a pipe 83, which leads into a chamber 84 (see Figure 9), preferably cast upon the cylinder 24. The chamber 84 has communication with the lower end of the cylinder 24 by means of ports 85, as shown. A port 37' is formed in the lower extension of the cylinder 24 and is adapted to be placed into communication with the chamber 84, when the piston 36 is elevated.

The numeral 86 designates a contracted port, serving to establish communication between the chambers 80 and 81, but this port is not adapted to allow the escape of pressure from beneath the piston 69 sufficiently to cause the piston to descend. The chamber 81 has communication with the chamber 80 through the valve seat opening or port 82, as above stated, and this opening is adapted to be covered and uncovered by an upwardly seating valve 87, carrying a downwardly seating valve 88, adapted when in the lowermost position to cover a port 89, supplying air to a whistle 90. The valve 87 is connected with a vertically movable rod 91, forming the core of a solenoid 92.

As more clearly shown in Figure 6, one end of the winding of the solenoid 92 is connected in series with a wire 93, having one end connected with the plate 25, as shown at 94, in Figure 2. The opposite end of the wire 93 is grounded to the frame-work of the engine, as shown at 95.

As more clearly shown in Figure 3, a section of track is provided, including rails 96, insulated at spaced intervals, as shown at 97, for dividing the track into blocks A, B, and C, of suitable length. Arranged in advance of the entrance end of each block, and at a suitable distance therefrom, is a ramp 98, which is longitudinally curved in a vertical plane and extends downwardly toward its opposite ends. The ramp 98 has connection with a wire 100, permanently connected with a stationary contact 101. This stationary contact 101 is engaged and disengaged by a swinging contact 102. The contact 102 has connection with a wire 103, connected with one rail 96. A source of current 103' is connected in the wire 103. Arranged near the contact 102 is an electro-magnet 104, one end of the winding of which is connected with a wire 105, and the opposite end of the wire 106. The wire 105 has a source of current 107 connected in series therewith. The wire 105 has electrical connection with a swinging contact 108, adapted to engage stationary contacts 109 and 110. The contact 109 is connected with the wire 106. The contact 108 is connected with a rod 111, having connection with a swinging semaphore paddle 112. When the paddle 112 is in the upper or clear position, the contact 108 engages the contact 109, and the circuit is closed for energizing the electro-magnet 104. In this closed circuit, current flows from one pole of the source of current 107 through contact 108, contact 109, wire 106, winding of the electro-magnet 104, and through wire 105, back to the opposite pole of the source of current 107. When the electro-magnet 104 is energized, contact 102 engages contact 101 and the ramp 98 is energized, but when the electro-magnet 104 is de-energized, contact 102 moves out of engagement with contact 101. The track circuit herewith shown and described is used simply for the purpose of illustration, as the invention may be operated in connection with track circuits of various characters.

As more clearly shown in Figure 1, the indicating and recording apparatus 113, which forms the subject-matter of the present application, is arranged in the cab 21 in a position to be conveniently viewed by the engineer. This apparatus embodies a speedometer 114, of any well known or preferred type, such as an Oliver Boyer. The speedometer is driven by a flexible shaft 115, which is suitably geared or connected to the axle of one of the wheels 116 of the engine. This speedometer has a face or dial 117, and a pointer 118, traveling in proximity thereto, as is customary.

I remove the ordinary cover of this speedometer and place upon the casing 119 thereof, a lid or cover 120, which is rigidly secured thereto by any suitable means.

The numeral 121 designates an upper casing section, disposed upon the cover 120 and hinged thereto, as shown at 122. This upper casing section 121 is normally held in the lower position by means of a screw 123 (see Figure 14) engaging in an opening 124, formed in the lid 120. Attention is called to the fact that the screw is arranged within the upper casing section and is, therefore, normally inaccessible. The forward side of the casing section 121 is cut away for the reception of a door 125, shown more clearly in Figures 12 and 13. This door is connected at its upper end with the top of the casing section 121, by hinges 126. The door 125 carries a staple 127, secured thereto by any suitable means, and adapted for the reception of a hasp 128, hinged to the lower portion of the casing section 121, as shown at 129. The staple is adapted for the reception of a pad-lock 130, of any well known or preferred construction.

Formed upon the outer side of the door 125 is an annular flange or casing 131, constituting a dial casing. This flange receives and holds a glass 132. A pivoted arm or indicator 133 is arrranged within the flange 131, and is rigidly secured to a rock-shaft 134, as shown. The pointer 133 is adapted to assume a horizontal danger position, and a vertical clear position, as indicated.

As more clearly shown in Figures 15 and 19, the lid or cover 120 has a vertical flange 135, rigidly secured thereto. This flange is provided with openings for receiving shafts 136, 137, and 138. These shafts carry rolls 139, 140, and 141, respectively, rigidly secured thereto. The shaft 136 has a gear 142 rigidly secured thereto, engaged and driven by a gear 143, receiving its rotation from clock works (not shown). The gear 142 engages and drives an intermediate gear 144, rigidly secured to the shaft 137. The gear 144 drives a gear 144', which engages and drives an outer gear 145, rigidly secured to the shaft 138. The numeral 146 designates a tape chart, having perforations 147, for receiving pins 148 formed upon the roll 141. The chart 146 is provided with transverse lines 149, slightly curved, and spaced apart for indicating time units, such as five minutes. The chart is also provided with longitudinal lines 150, indicating the number of miles per hour that the engine is traveling, starting from the right with "0" and ending with "90", the spaces between the lines indicating speed units of five miles per hour. The chart is provided with longitudinal edges 151, which are plain, and adapted for receiving indications thereon, to be described.

A marker 152 is arranged to travel in contact with the tape 146, for recording the speed of travel of the engine, and this marker as shown in Figure 17ª, is carried by a pivoted arm 153, connected with the pointer 118, and operated thereby. It is thus apparent that, as the speed of the engine increases, the marker 152 travels to the left or in the direction of its arrow, thereby making a line 154, indicating the speed.

I provide means for recording each time the shoe 51 contacts with the ramp, when the ramp is energized, such means comprising a solenoid winding 155, arranged within the casing section 125, above the chart, and having a horizontal reciprocatory core 156. This core has connection at its forward end with a head 157, having a flat face 158 provided with a groove 159 therein, as clearly shown in Figure 14ª. This groove receives a pin 160, which is rigidly secured to a disk 161, rigidly attached to the upper end of a vertical rock shaft 162, journaled through a stationary bearing 163. A ring 164 is rigidly attached to the lower end of the rock shaft 162 and carries a laterally extending crank or pin 165, as clearly shown in Figure 19. This crank or pin 165, is arranged outwardly of and in contact with a vertically swinging lever 166 (see Figure 17ª), carrying a marker 167. The lever 166 has restricted inward movement along a guide 168, having a stop 169. From the foregoing description, it is obvious that the marker 167 will normally draw a straight line 170 upon the margin 151, but when the solenoid winding 155 is energized, the vertical rock shaft 162 will be turned in a direction to cause the crank 165 to swing the marker 167 inwardly, in a quick manner, thereby drawing a transverse line 171. As soon as the solenoid winding 155 is deenergized, a compressible coil spring 172 quickly returns the solenoid 156 to the outer position, and a spring 166' returns the lever 166 to the outer position.

As clearly shown in Figure 6, the solenoid winding 155 is connected in series with the wire 93, whereby each time the shoe contacts with an energized ramp, a circuit will be closed for energizing the solenoid winding 155, simultaneously with energizing the solenoid winding 92.

I also provide means for recording each time the train stopping means is thrown into action, which occurs when the shoe contacts with the de-energized ramp. This means comprises a cylinder 173, shown more clearly in Figure 16. The cylinder 173 is preferably cast integral with the rear end of the casing section 121, and has communication with a pressure supply chamber 174, through the medium of a port 175. The chamber 174 receives pressure through a pipe 176 connected therewith by a coupling 176'. The opposite end of the pipe 176, as clearly shown in Figure 14, is connected with a tubular coupling 177, screw-threaded in an opening 178, formed in the bottom portion 179 of the casing section 121. The bottom portion is cut away providing an opening 180, as clearly shown in Figure 15. The lower end of the tubular coupling 178 is tapered, as shown at 181, and is adapted for insertion within a tapered recess 182 which is formed in the forward portion of the cover 120. The recess 182 leads into a port 183, communicating with a chamber 184, cast upon the cover 120, as shown. A pipe 185 leads into the chamber 184, and this pipe 185, as clearly shown in Figures 1 and 2, leads into the lower end of the exhaust port 79. The tubular coupling 177 forms an air-tight connection with the recess 182, which may contain suitable packing, and when the casing section 121 is swung upwardly, by unscrewing the screw 123, it is obvious that the pipe 176 will be placed in communication with the atmosphere and the pipe 185 in communication with the atmosphere. When the pipe 185 is placed in communication with the atmosphere, the pressure is reduced upon the lower side of the piston 69, thus causing the same to descend, and apply the brakes.

As more clearly shown in Figure 16, a piston 186 is arranged to reciprocate within the cylinder 173 and has connection with a piston rod 187, operating within a guide sleeve 188. This guide sleeve has a screw-threaded portion 189 inserted within an opening formed in a stationary bracket 190. Surrounding the sleeve 188 is a compressible coil spring 191, one end of which engages a flange 192 formed upon the sleeve 188 and the opposite end of which engages the piston 186. It is thus apparent that when pressure is exhausted from the cylinder 173, the spring 191 will move the piston 186 rearwardly, causing the rod 187 to move rearwardly. The rod 187 has a cross head 193 rigidly secured thereto, and this cross head has a plate 194 rigidly secured to one end. The plate 194 has an elongated opening 195, receiving a pin 196, contacting with the forward end wall of the opening 195, as shown. This pin 196 is secured to a crank 197, rigidly connected with a vertical rock-shaft 198. The vertical rock-shaft 198 is journaled within a stationary sleeve 199 and carries a ring 200, rigidly secured to the lower end thereof. The ring 200 is provided with a crank or pin 201, shown more clearly in Figure 19, as arranged outwardly of and upon one side of a pivoted lever 202, as more clearly shown in Figure 17ᵃ. The lever 202 is moved outwardly by a spring 203. At its upper end, the lever 202 carries a marker 204, contacting with the margin 151'. The marker 204 normally draws a straight line 205 but when the pressure is reduced within the cylinder 173, the rock-shaft 198 is turned, and the crank 201 swings the marker 204 inwardly, drawing a short straight line 206, thus making a record of each time the piston 186 travels rearwardly, which occurs when the pressure is reduced upon the lower side of the cylinder 69 and the air brake valve is actuated to stop the engine.

As more clearly shown in Figure 17, the numeral 207 designates a disk, rigidly attached the inner end of the shaft 134. This disk is provided at one end with a crank 208, carrying a pin 209, operating within a transverse slot 210, formed in a reciprocatory bar 211. This reciprocatory bar has a transverse element 212 rigidly attached to its upper end, having connection with a retractile coil pring 213, attached to one of a pair of stationary tracks 214. A carriage 215 is mounted to slide within and between the tracks 214, and is rigidly connected with the bar 211. When the bar 211 is released, the spring 213 moves it downwardly, the pin 209 revolving the disk 207, thereby swinging the pointer 133 to the upper clear position. The disk 207 is provided with a horizontal lock-crank 216, adapted to engage beneath the hooked end 218 of a swinging lever 219, pivoted to a stationary support, at 220, as clearly shown in Figure 18. The lever 219 has pivotal connection with a link 221, pivoted to the cross head 157. It is thus seen that when the solenoid winding 155 is energized, the lever 219 is moved rearwardly and the lock-crank 216 released, whereby the pointer 133 automatically moves to the upper clear position.

As more clearly shown in Figures 14 and 16, the cross head 193 has a bell-crank lever 222, pivotally attached thereto by means of a screw 223, and projecting forwardly therefrom. This bell-crank lever is pivoted at its apex, at 223', with the stationary bracket 190. When the piston 186 is held in the forward position by air pressure, the cross-head 193 is also in the forward position. The bell-crank lever 222 is now positioned so that its free end is beneath and spaced from the lower end of the bar 211, which is in the elevated position. When the bar 211 is released, it descends and contacts with the free end of the bell-crank lever. When air is exhausted from the cylinder 173, the cross-head 193 moves rearwardly, swinging bell-crank lever 222 upon its pivot 223'. The free end of the bell-crank lever 222 is thus swung upwardly and contacts with the lower end of the bar 211, thus returning the same to the upper position.

As more clearly shown in Figure 17, a rock-shaft 224 is journaled within a vertical stationary bearing 225, fixed to the inner side of the door 125, as shown at 226. At one end, the rock shaft 224 is provided with a crank 227, which is bent to extend through an opening 228 and terminates in an extension 229 projecting to the exterior of the door. As shown in Figures 12 and 15, the extension 229 of the crank 227 is arranged beneath the hasp 128, and is held depressed thereby. At its opposite end, the rock-shaft 224 is provided with a crank 230, forced outwardly toward the door by a spring 231. The crank 230 carries an extension 232. When the extension 229 is depressed by the hasp 128, which is the case when the hasp is locked in the closed position, the extension 232 is moved inwardly horizontally out of the path of travel of the reciprocatory bar 211, and therefore, does not function to prevent the downward movement of this bar. When the door 125 is open, the extension 232 is forced outwardly beneath the bar 211, and will therefore, hold it against downward movement, until the crank 216 is shifted beneath the hooked end 218.

The operation of the apparatus is as follows:

Assuming that the ramp 98 which guards the entrance of the block C is energized, when the locomotive 20 traveling toward the entrance end of the block C, moves into proximity to the ramp 98, the shoe 51 contacts with the ramp 98 and is elevated thereby. This upward movement of the shoe (see Figure 8) places the chamber 84 in communication with the atmosphere through the port 37', but the valve 87 is previously closed by the solenoid winding 92, being energized when the shoe contacts with the energized ramp. This being the case, the piston 69 cannot descend to apply the brakes. When the solenoid winding 92 is energized, the solenoid winding 155 is simultaneously energized whereby the core 156 is drawn inwardly in opposition to the spring 172. This inward movement of the core causes the marker 167 to move inwardly upon the edge 151 of the chart 146 to draw the transverse line 171, extending at a right angle to the straight line 170. The straight line 170 is continually drawn, as the chart 146 is fed in the direction of the arrow, and at the proper speed, to wit, for the distance between the transverse lines 149 for each five minutes by the clock-works. It is thus apparent that each time the locomotive passes an energized ramp, the transverse line 171 is drawn.

Assuming that the ramp 98 is de-energized when the locomotive approaches the same, as herein above stated, the chamber 84 would be placed in communication with the atmosphere through the port 37', and the solenoid winding 92 would be de-energized. The valve 87 is now opened, whereby pressure will exhaust to the atmosphere from beneath the piston 69, such pressure passing by way of the pipe 83 and associated elements. The piston 69 will now descend together with the rod 71, thus rocking the bell-crank lever 72, unwinding the cable 74 and operating the engineer's valve to apply the brakes. When the pressure is reduced beneath the piston 69, it is simultaneously reduced within the chamber 184, through the medium of the pipe 185, and associated elements. The pressure is thereby reduced in the cylinder 173 and the piston 186 moves under action of the spring 191. The cross head 193 and associated elements now swing the marker 204 inwardly, to draw the straight transverse line 206, arranged at a right angle to the longitudinal line 205, which is continually drawn by the marker. It is apparent that each time the locomotive passes a de-energized ramp, the mark 206 will be made.

By reference to Figure 18ª, it will be seen that the chart 146 affords a complete record of the entire operation of the apparatus or system. The chart will indicate the number of ramps which the locomotive has passed, and whether or not the ramps were energized or de-energized. The chart will indicate the number of applications of the air brakes. The chart will also indicate the speed at which the engine is traveling as it approached or passed a ramp, energized or de-energized.

Each time the solenoid winding 155 is energized, the pointer 133 is released and moves to the upper clear position. When the piston 186 moves rearwardly and the brakes are applied, the bell-crank lever 222 elevates the bar 211, thus returning the pointer 133 to the lowered danger position. The pointer is held in this position until the piston 186 moves forwardly, whereby the free end of the bell-crank lever 222 descends and becomes spaced from the bar 211. When the shoe contacts with the next energized ramp, the bar 211 will be released and the pointer again returned to its upper clear position.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with a pneumatically operated electrically controlled train stopping mechanism, of a recorder comprising a cylinder, a piston operating in said cylinder, said cylinder being supplied with fluid under pressure when the train stopping mechanism is in set position, means for exhausting fluid from said cylinder when the train stopping mechanism is actuated to operate said piston, a traveling chart arranged adjacent said cylinder, and a marker contacting with said chart and connected to said piston to be shifted thereby.

2. The combination with a pneumatically operated electrically controlled train stopping mechanism, of a recorder comprising a cylinder, a piston operating in said cylinder, said cylinder being supplied with fluid under pressure when the train stopping mechanism is in set position, means for exhausting fluid from said cylinder when the train stopping mechanism is actuated to operate said piston, a traveling chart arranged adjacent said cylinder, a normally stationary marker contacting with said chart to draw a substantially straight line thereon, and connecting means between said piston and said marker to shift the marker laterally upon the movement of the piston.

3. The combination with a pneumatically operated electrically controlled train stopping mechanism, of a recorder comprising a cylinder, a piston operating in said cylinder, said cylinder being supplied with fluid when the train stopping mechanism is in set position, means for exhausting fluid from said cylinder when the train stopping mechanism is actuated to operate said piston, a chart arranged adjacent said cylinder, means for moving said chart at a constant speed, a normally stationary marker contacting with said chart to draw a substantially straight line thereon, and means controlled by the actuating of said piston to shift said marker laterally to draw a transverse line on said chart.

4. The combination with a pneumatically operated electrically controlled train stopping mechanism, of a recorder comprising a casing, a cylinder arranged in said casing and connected to said train stopping mechanism to maintain a pressure in said cylinder substantially equal to the pressure in said train stopping mechanism, a piston mounted in said cylinder, said piston being normally retained in said position by pressure in said cylinder, a spring to operate said piston when said pressure is removed, a movable chart arranged adjacent said piston, and a marker contacting with said chart and connected to said piston.

5. The combination with a pneumatically operated electrically controlled train stopping mechanism, of a recorder comprising a casing, a cylinder mounted in said casing and connected to said train stopping mechanism, whereby the pressure in said cylinder is substantially equal to the pressure in said train stopping mechanism, a piston mounted in said cylinder and normally retained in said position by pressure in said cylinder, a spring engaging said piston to operate it when the pressure is removed, a longitudinally movable chart arranged adjacent said piston, a normally stationary marker contacting therewith, a rock shaft having a crank to engage said marker and shift it laterally, and connections between said rock shaft and said piston.

In testimony whereof I affix my signature in presence of two witnesses.

WILLIAM B. MURRAY.

Witnesses:
  FRED M. HESS,
  J. A. FOSTER.